Patented Feb. 3, 1953

2,627,529

UNITED STATES PATENT OFFICE 2,627,529

PYROLYSIS OF DIFLUOROMONOCHLOROETHANE

Charles F. Feasley and William A. Stover, Woodbury, N. J., assignors to Socony-Vacuum Oil Company, Incorporated, a corporation of New York No Drawing. Application October 23, 1947, Serial No. 781,755

4 Claims. (Cl. 260—653)

This invention relates to the pyrolysis of 1,1-difluoro-1-chloroethane to produce 1,1-difluoroethylene and 1-chloro-1-fluoroethylene and polymers and copolymers thereof.

Most prior work has dealt with fluorine compounds known to be less stable than 1,1-difluoro-1-chloroethane. Such compounds are characterized by the fact that they contain hydrogen, or halogens other than chlorine and fluorine, in positions that make them relatively unstable. Compounds such as difluorobromomethane, difluorochloromethane, $CF_2BrCClFBr$, and the like have previously been subjected to pyrolysis but, insofar as is known, 1,1-difluoro-1-chloroethane has not previously been subjected to pyrolysis, nor have 1-chloro-1-fluoroethylene or 1,1-difluoroethylene or their polymers or copolymers been produced by pyrolysis.

It has been discovered that 1,1-difluoro-1-chloroethane, a relatively inexpensive, commercially available compound, can be pyrolyzed to obtain high yields of 1,1-difluoroethylene and 1-chloro-1-fluoroethylene, and polymers and copolymers thereof. This pyrolysis can be accomplished at temperatures ranging from about 1500° F. to about 1800° F. at contact times ranging from about 0.5 second to 5 seconds or even longer depending upon the temperature employed. Preferred temperatures have been found to be from about 1500 to about 1700° F.

In the following specific examples, the reactions were accomplished at atmospheric pressure by passing 1,1-difluoro-1-chloroethane through a flow meter and then through a fused silica tube, 19 mm. x 25 mm. x 750 mm., heated by an electric furnace over 330 mm. of tube length. The products as formed were passed first through a trap cooled by immersion in an ice-water bath, then through a caustic solution scrubber to remove hydrogen halides, and finally through a meter and into a gas holder or gas sample bottle.

Temperatures as low as 1000° F. or below may be employed when the tube is filled with a catalyst such as iron wire, although under this catalytic influence more side reactions occur. Nickel, cobalt, chromium, and other metals appear to catalyze the reaction. Temperatures of 1800° F. or even higher appear satisfactory in the absence of catalysts, but very good results were achieved at 1500° F. to 1700° F. and this range of temperatures is preferred.

Atmospheric pressure was used in the following runs. Pressures either higher or lower than atmospheric pressure may be expected to produce satisfactory results. Either a continuous or batch process of pyrolysis should prove satisfactory, and unconverted difluorochloroethane may be recycled to raise the efficiency of conversion of the over-all process.

The rate of gas flow through the heated tube, and hence the length of treatment of the difluorochloroethane may be varied to produce the most efficient operation. Under the particular circumstances of this specific example a gas rate of 650 to 800 cc. per minute at a temperature of 1600° F. was found to produce good yields of difluoroethylene and fluorochloroethylene. This rate of flow causes a unit volume of the difluorochloroethane to remain in the heated portion of the tube for about 1.5 to 2.0 seconds. Theating periods of from 1.9 seconds to 60 seconds are within the contemplation of this invention, although periods of from 1.9 seconds to about 5 seconds are generally preferred.

In a continuous process, the contact time or space velocity of the material may be calculated by dividing the volume of the reactor (heated portion only) by the volume of the gas charged (at reaction temperature), per second.

The following table shows the results of two typical runs using the equipment and process described hereinbefore.

*Table—Pyrolysis of $CH_3CF_2Cl$ at 1600° F.*

| Run | Temperature, °F. | Rate of Charge for $CH_3CF_2Cl$, cc./Min. | Contact[2] Time, Sec. | Total Volume, Liters | | | B. P., °C. | Mole, Percent | Sp. Gr. | Compound | Podbielniak Analysis of Gas Sample | | |
|---|---|---|---|---|---|---|---|---|---|---|---|---|---|
| | | | | $CH_3CF_2Cl$ Charged | Caustic Scrubbed Exit Gases | Liquid Products | | | | | Molecular Wt., Calculated | Found by Gas, Gravity | Found by Mass, Spectrograph |
| 1 | 1,600 | 850 | 1.5 | 205 | 185 | [1] 5 | −80<br>−24<br>− 7.5 | 22.6<br>10.2<br>66.5 | 2.212<br>2.618<br>3.527 | $CF_2=CH_2$<br>$CFCl=CH_2$<br>$CF_2Cl—CH_3$ | 64.0<br>80.5<br>100.5 | 64.2<br>75.9<br>101.3 | 64<br>80<br>101 |
| 2 | 1,600 | 650 | 1.9 | 169 | 162 | [1] 50 | −81<br>−24<br>− 7.5<br>Residue | 67.0<br>13.5<br>15.8<br>1.5 | 2.212<br>2.618<br>3.527 | $CF_2=CH_2$<br>$CFCl=CH_2$<br>$CF_2Cl—CH_3$ | 64.0<br>80.5<br>100.5 | 64.2<br>75.9<br>101.3 | 64<br>80<br>101 |

[1] When these liquid products (almost solid at 0° C.) were combined and mixed with water in an attempt to remove hydrogen halide of vigorous reaction took place with the liberation of much heat. The resulting mixture was a homogeneous solution indicating the presence a water-soluble material which has not been characterized or identified to date.

[2] Contact time calculated by using volume of gases at reaction temperatures.

What is claimed is:

1. A method of converting 1,1-difluoro-1-chloroethane into 1,1-difluoroethylene and 1-chloro-1-fluoroethylene and polymers or copolymers thereof that comprises pyrolyzing the 1,1-difluoro-1-chloroethane at a temperature of between about 1500° F. and about 1700° F. for a period of time varying between about 1.9 seconds and about 60 seconds.

2. A method of converting 1,1-difluoro-1-chloroethane into 1,1-difluoroethylene and 1-chloro-1-fluoroethylene and polymers or copolymers thereof that comprises pyrolyzing the 1,1-difluoro-1-chloroethane at a temperature of about 1500° F. to about 1700° F. for a period of time varying between about 1.9 seconds to about 5 seconds.

3. A method of converting 1,1-difluoro-1-chloroethane into 1,1-difluoroethylene and 1-chloro-1-fluoroethylene and polymers or copolymers thereof that comprises pyrolyzing the 1,1-difluoro-1-chloroethane at a temperature of about 1500° F. to about 1700° F. for a period of time varying between about 1.9 seconds and about 5 seconds and separating 1,1-difluoroethylene and 1-chloro-1-fluoroethylene from the unreacted 1,1-difluoro-1-chloroethane and by-products of the reaction.

4. A method of converting 1,1-difluoro-1-chloroethane into 1,1-difluoroethylene and 1-chloro-1-fluoroethylene and polymers or copolymers thereof that comprises pyrolyzing the 1,1-difluoro-1-chloroethane at a temperature of about 1500° F. to about 1700° F. for a period of time varying between about 1.9 seconds and about 5 seconds, separating 1,1-difluoroethylene and 1-chloro-1-fluoroethylene from the unreacted 1,1-difluoro-1-chloroethane and by-products of the reaction, and recycling the unreacted 1,1-difluoro-1-chloroethane.

CHARLES F. FEASLEY.
WILLIAM A. STOVER.

REFERENCES CITED

The following references are of record in the file of this patent:

UNITED STATES PATENTS

| Number | Name | Date |
|---|---|---|
| 2,551,573 | Downing et al. | May 8, 1951 |

FOREIGN PATENTS

| Number | Country | Date |
|---|---|---|
| 581,405 | Great Britain | Oct. 11, 1946 |

OTHER REFERENCES

Torkington et al.: Trans. Faraday Soc., vol. 41, pp. 236–7 (1945).